(12) United States Patent
Smith

(10) Patent No.: US 10,811,169 B2
(45) Date of Patent: Oct. 20, 2020

(54) SYSTEMS AND METHODS FOR TAMPER PROOF CABLES

(71) Applicant: CommScope Technologies LLC, Hickory, NC (US)

(72) Inventor: Peter Smith, Chester (GB)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/307,267

(22) PCT Filed: Aug. 28, 2017

(86) PCT No.: PCT/US2017/048879
§ 371 (c)(1),
(2) Date: Dec. 5, 2018

(87) PCT Pub. No.: WO2018/044782
PCT Pub. Date: Mar. 8, 2018

(65) Prior Publication Data
US 2019/0304626 A1    Oct. 3, 2019

Related U.S. Application Data

(60) Provisional application No. 62/382,029, filed on Aug. 31, 2016.

(51) Int. Cl.
*G08B 13/00*    (2006.01)
*H01B 7/32*    (2006.01)
(Continued)

(52) U.S. Cl.
CPC ........... *H01B 7/328* (2013.01); *G02B 6/4469* (2013.01); *G02B 6/4479* (2013.01); *G08B 13/12* (2013.01);
(Continued)

(58) Field of Classification Search
CPC ........ H01B 7/328; H01B 7/228; H01B 13/06; H01B 13/2606; G02B 6/4469; G02B 6/4479; G08B 13/12; G08B 13/1445
(Continued)

(56) References Cited

U.S. PATENT DOCUMENTS 3,843,846 A * 10/1974 Miller ..................... G11B 9/075
369/126
4,039,939 A * 8/1977 Wagner ................. G01N 27/223
324/611
(Continued)

FOREIGN PATENT DOCUMENTS

DE    10017455 A1    10/2001
EP    0655751 A2    5/1995
(Continued)

OTHER PUBLICATIONS

International Searching Authority; "Notification of Transmittal of the International Serach Report and the Written Opinion of the International Searching Authority, or the Declaration, from PCT Application No. PCT/US2017/048879, dated Dec. 5, 2017"; from Foreign Counterpart of U.S. Appl. No. 62/382,029; pp. 1-14; dated Dec. 5, 2017; Published: KR.
(Continued)

*Primary Examiner* — Kerri L McNally
*Assistant Examiner* — Thang D Tran
(74) *Attorney, Agent, or Firm* — Fogg & Powers LLC

(57) ABSTRACT

Systems and methods for tamper proof cables are described herein. In certain implementations, a system includes one or more pieces of equipment and one or more tamper proof cables connecting the equipment within a network. A tamper proof cable includes a core that provides a transmission medium through the cable; an insulator enveloping the core; a first conductive braid encircling the insulator; a dielectric
(Continued)

enveloping the first conductive braid; and a second conductive braid encircling the dielectric, the first and second conductive braids, and the dielectric forming a capacitor. The system includes one or more detectors, each detector coupled to the tamper proof cables, each detector and an associated capacitor forming a tuned circuit, the detectors providing a signal when an associated portion of the tamper proof cables is tampered with; a monitor coupled to the detectors that notifies an infrastructure management system when the signal is received.

24 Claims, 6 Drawing Sheets

(51) Int. Cl.
*G02B 6/44* (2006.01)
*G08B 13/12* (2006.01)
*H01B 7/22* (2006.01)
*H01B 13/06* (2006.01)
*H01B 13/26* (2006.01)
*G08B 13/14* (2006.01)

(52) U.S. Cl.
CPC .......... *H01B 7/228* (2013.01); *H01B 13/06* (2013.01); *H01B 13/2606* (2013.01); *G08B 13/1445* (2013.01)

(58) Field of Classification Search
USPC ........................................................ 340/541
See application file for complete search history.

(56) References Cited

U.S. PATENT DOCUMENTS

| | | | | | |
|---|---|---|---|---|---|
| 4,260,949 | A | * | 4/1981 | Dalton, Jr. | G01R 33/24 324/302 |
| 4,906,975 | A | * | 3/1990 | Casella | G08B 13/122 340/566 |
| 5,085,070 | A | * | 2/1992 | Miller | B82Y 35/00 73/105 |
| 5,469,364 | A | * | 11/1995 | Hughey | H03K 17/962 702/65 |
| 5,512,838 | A | * | 4/1996 | Roach | G01R 1/06711 324/149 |
| 8,150,074 | B1 | * | 4/2012 | Feldstein | H04R 3/00 333/17.3 |
| 9,147,655 | B2 | * | 9/2015 | Chiou | H01L 27/016 |
| 9,147,974 | B2 | | 9/2015 | Wang | |
| 2002/0027008 | A1 | * | 3/2002 | Berg | H01B 13/30 174/24 |
| 2002/0121987 | A1 | * | 9/2002 | Besser | H01B 7/046 340/854.9 |
| 2003/0071639 | A1 | * | 4/2003 | Haag | E05F 15/46 324/674 |
| 2003/0085844 | A1 | * | 5/2003 | Olson | H01Q 1/04 343/749 |
| 2004/0175561 | A1 | * | 9/2004 | Duff, Jr. | G03G 5/0202 428/317.9 |
| 2006/0032658 | A1 | * | 2/2006 | Abe | H01B 11/1813 174/75 C |
| 2006/0173284 | A1 | * | 8/2006 | Ackerman | G01R 33/34046 600/422 |
| 2007/0207754 | A1 | * | 9/2007 | Gomi | H04B 1/18 455/193.3 |
| 2009/0221179 | A1 | | 9/2009 | Citurs | |
| 2009/0273353 | A1 | * | 11/2009 | Kroh | G01L 9/0073 324/655 |
| 2010/0006318 | A1 | * | 1/2010 | Elie | H01B 3/105 174/105 R |
| 2010/0026393 | A1 | * | 2/2010 | Keerti | H03F 1/56 330/302 |
| 2011/0130034 | A1 | * | 6/2011 | Montena | H01R 24/42 439/578 |
| 2011/0292297 | A1 | * | 12/2011 | Tomiyama | H03J 3/08 348/731 |
| 2012/0019267 | A1 | * | 1/2012 | Tabuchi | G01R 15/18 324/686 |
| 2012/0062390 | A1 | * | 3/2012 | Solomon | H04Q 9/00 340/870.03 |
| 2012/0278013 | A1 | * | 11/2012 | Ganesh | G01R 31/083 702/59 |
| 2013/0207715 | A1 | * | 8/2013 | Salo | G06F 3/016 327/517 |
| 2013/0309888 | A1 | * | 11/2013 | Nicholson | E21B 36/00 439/271 |
| 2013/0329335 | A1 | * | 12/2013 | Obata | G06F 3/046 361/278 |
| 2014/0084943 | A1 | * | 3/2014 | Kroh | G01B 7/24 324/633 |
| 2014/0183691 | A1 | * | 7/2014 | Saraswat | H01L 23/481 257/531 |
| 2014/0253289 | A1 | * | 9/2014 | Groth | H05K 7/1498 340/8.1 |
| 2015/0085994 | A1 | | 3/2015 | Koyabe et al. | |
| 2015/0171911 | A1 | * | 6/2015 | Yang | H01Q 5/378 455/280 |
| 2015/0285849 | A1 | * | 10/2015 | Sako | G01R 27/2605 324/538 |
| 2016/0337512 | A1 | | 11/2016 | Kalavai | |
| 2017/0237267 | A1 | * | 8/2017 | Kallal | H02J 50/12 307/104 |
| 2018/0067003 | A1 | * | 3/2018 | Michiwaki | G01L 1/22 |
| 2018/0120142 | A1 | * | 5/2018 | Squires | B67D 7/78 |

FOREIGN PATENT DOCUMENTS

| | | |
|---|---|---|
| GB | 471122 A | 8/1937 |
| WO | 9728418 A1 | 8/1997 |
| WO | 2018044782 A1 | 3/2018 |

OTHER PUBLICATIONS

European Patent Office, "Extended European Search Report from EP Application No. 17847301.3", from Foreign Counterpart to U.S. Appl. No. 16/307,267, dated Mar. 10, 2020, pp. 1-9, Published: EP.

* cited by examiner

SYSTEMS AND METHODS FOR TAMPER PROOF CABLES

CROSS REFERENCE TO RELATED APPLICATIONS

This application claims the benefit of PCT International Application No. PCT/US2017/048879, filed on Aug. 28, 2017, same tile herewith, which in turn claims the benefit of U.S. Provisional Patent Application Ser. No. 62/382,029, filed on Aug. 31, 2016, both of which are hereby incorporated herein by reference.

BACKGROUND

Telecommunications networks typically include numerous logical communication links between various items of equipment. Often a single logical communication link is implemented using several pieces of physical communication media. For example, a logical communication link between a computer and an inter-networking device such as a hub or router can be implemented as follows. A first cable connects the computer to a jack mounted in a wall. A second cable connects the wall-mounted jack to a port of a patch panel, and a third cable connects the inter-networking device to another port of a patch panel. A "patch cord or cable" cross connects the two together. In other words, a single logical communication link is often implemented using several segments of physical communication media.

Various types of physical layer management (PLM) systems can be used to track connections made at patch panels and other types of equipment used to make connections in communication networks. Generally, such PLM systems include functionality to track what is connected to each port of such equipment, trace connections that are made using such equipment, and provide visual indications to technicians at such equipment (for example, by illuminating an LED that is associated with a patch panel or a port thereof).

PLM systems typically include management software that aggregates the captured information and stores it in one or more databases. One example of such management software is Infrastructure Configuration Manager (ICM) software.

In certain systems, the cables used to connect the devices in the network may be monitored for tampering to determine if the cables are pierced or cut. For example, a "secure" cable may have a shield or conductive braid surrounding the core of the cable. A current may then be conducted through the shielding. If something were to happen to the cable that causes the shielding to be cut, the current that is passing through the shielding becomes altered or interrupted. A monitoring system, such as the ICM, for example, may determine that the cable has been tampered with due to the interruption or change of current. The monitoring system then may alert the owner of the cable of the suspected tampering. Further, in some facilities, people may be employed to monitor the cables for signs of tampering. However, while the "secure" cables above are able to detect when cables are cut, they are unable to determine when cables have moved. Also, visual inspection for movement takes time and is subject to human limitations that inhibits the continuous inspection of the cables for signs of tampering.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

In the exemplary embodiments described herein, systems and methods for tamper proof cables are provided. Systems implementing the tamper proof cables are able to monitor cabling for the physical movement of the cabling, interruption of the cabling caused by tapping of a cable, and cutting of a cable. According to embodiments described herein, the system is able to monitor the cabling through the use of two conductive braids that are wrapped around the cable core, where the two conductive braids are separated by a dielectric material. The combination of the two conductive braids separated by a dielectric forms a capacitor that is wrapped around the cable core. The capacitor may then become part of a tuned circuit. As such a monitoring circuit is able to monitory the frequency of the tuned circuit formed by the capacitor. As such, if the cable experiences any change that could affect the capacitance of the two conductive braids, the frequency of the tuned circuit will change. The change in frequency may be detected by the monitoring circuit, where the monitoring circuit can indicate to a user that a cable has experienced a change. In certain implementations, the monitoring circuit may be able to indicate a location along a particular cable of a capacitance change.

Figure 1:
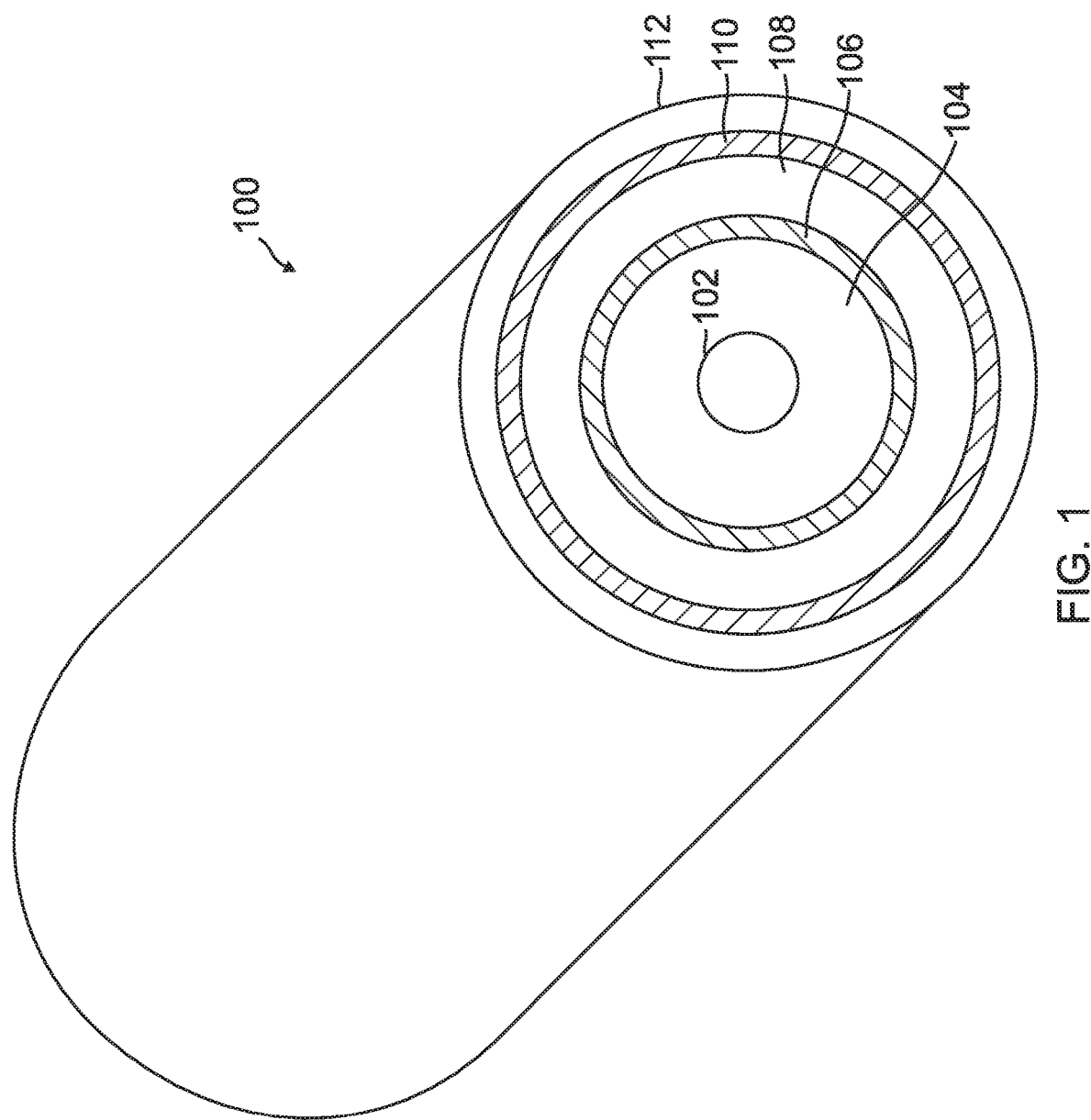
FIG. 1 is a cross section view of an exemplary embodiment of a tamper proof cable.

FIG. 1 is a cross sectional diagram of a tamper proof cable 100. As illustrated the tamper proof cable 100 includes a cable core 102. The cable core 102 may be a solid conductor, a fiber optic cable, a pair or bundle of wires, a coaxial cable, or other type of medium known to one having skill in the art for the transmission of information or power from one location to another. In certain implementation, the cable core 102 may be surrounded by an insulator 104, where the insulator is surrounded by a pair of conductive braids 106 and 110. Alternatively, depending on the type of medium, the insulator 104 may be any material that isolates the cable core 102 from the pair of conductive braids 106 and 110. Further, the conductive braids 106 and 110 are sufficiently separated from the cable core 102 by the insulator such that the conductive braids 106 and 110 do not affect the operation of the cable core 102.

In certain implementations, the conductive braids 106 and 110 are separated from one another by a dielectric 108. As such, the tamper proof cable 100 includes an inner conductive braid 106 and an outer conductive braid 110, where the inner conductive braid 106 is separated from the outer conductive braid 110 by the dielectric 108. The dielectric 108 may be formed from any material that is known to one having skill in the art that is capable of functioning as a dielectric that still allows the cable to bend as desired. As the dielectric 108 is between the inner conductive braid 106 and the outer conductive braid 110, the combination of the inner conductive braid 106, the dielectric 108, and the outer conductive braid 110 form a capacitor that runs along a desired length of the tamper proof cable 100. In at least one further implementation, the tamper proof cable 100 includes a protective sheath 112 that envelopes the conductive core 102 and the conductive braids 106 and 110 to provide physical protection to the components of the tamper proof cable 100.

In at least one implementation, the inner conductive braid 106 is arranged such that the inner conductive braid 106 is substantially oriented at a forty five degree angle with respect to the cable core 102. Further, the outer conductive braid 110 is arranged such that the outer conductive braid 110 is also oriented at a forty five degree angle with respect to the cable core 102, however the outer conductive braid 110 is arranged such that the outer conductive braid 110 is orthogonally oriented with respect to the orientation of the inner conductive braid 106. Because the inner conductive braid 106 and the outer conductive braid 110 are separated from one another by the dielectric 108, the combination of the inner conductive braid 106, dielectric 108, and outer conductive braid 110 form a capacitor that runs along a desired length of the tamper proof cable 100.

In exemplary implementations described herein, detectors may be coupled to the tamper proof cable 100, where the detectors monitor the frequency response of a tuned circuit that includes the capacitor formed by the combination of the inner conductive braid 106, dielectric 108, and outer conductive braid 110. For example, the capacitor may be part of the tuned circuit and the frequency response of the tuned circuit may be determined when the cable is stationary. Further, the detector may be coupled to a power source that provides a voltage for the tuned circuit. Accordingly, changes in capacitance due to tampering cause the frequency response of the tuned circuit to change. For example, the capacitance may change due to the physical movement of the cable, which may be a precursor to tapping and/or cutting of the cable. The capacitance may also be changed due to the interruption of the cable caused by a tapping device, as the tapping device may move between the conductive braids 106 and 110 to contact the cable core 102. Further, the capacitance may change due to the physical cutting of the cable.

Figure 2:
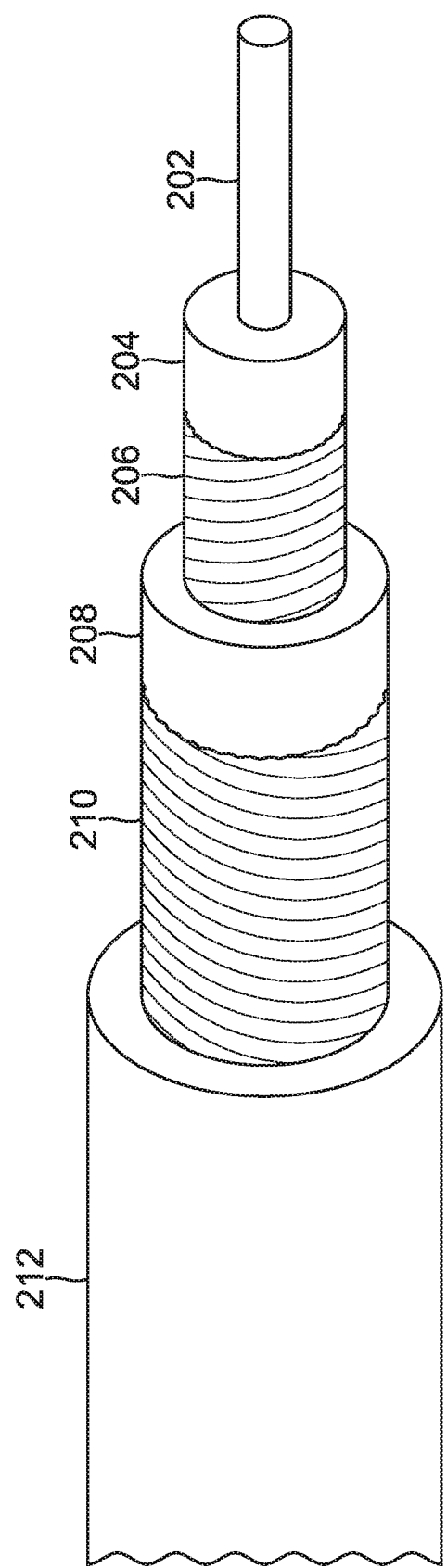
FIG. 2 is a diagram illustrating a side view of the components of a tamper proof cable in at least one exemplary embodiment.

FIG. 2 illustrates a side view of a tamper proof cable. As described above with relation to FIG. 1, a cable core 202 is enveloped by an insulator 204. The insulator 204 is then enveloped by an inner conductor braid 206, where the inner conductor braid 206 functions similarly to inner conductor braid 106 in FIG. 1. The inner conductor braid 206 is then enveloped by a dielectric 208, where the dielectric 208 functions similarly to dielectric 108. The dielectric is then enveloped by the outer conductive braid 210, where the outer conductive braid 210 functions similarly to outer conductive braid 110. The outer conductive braid 110 may be surrounded by a protective sheath 212, where the protective sheath 212 is similar to the protective sheath 112.

Figure 3:
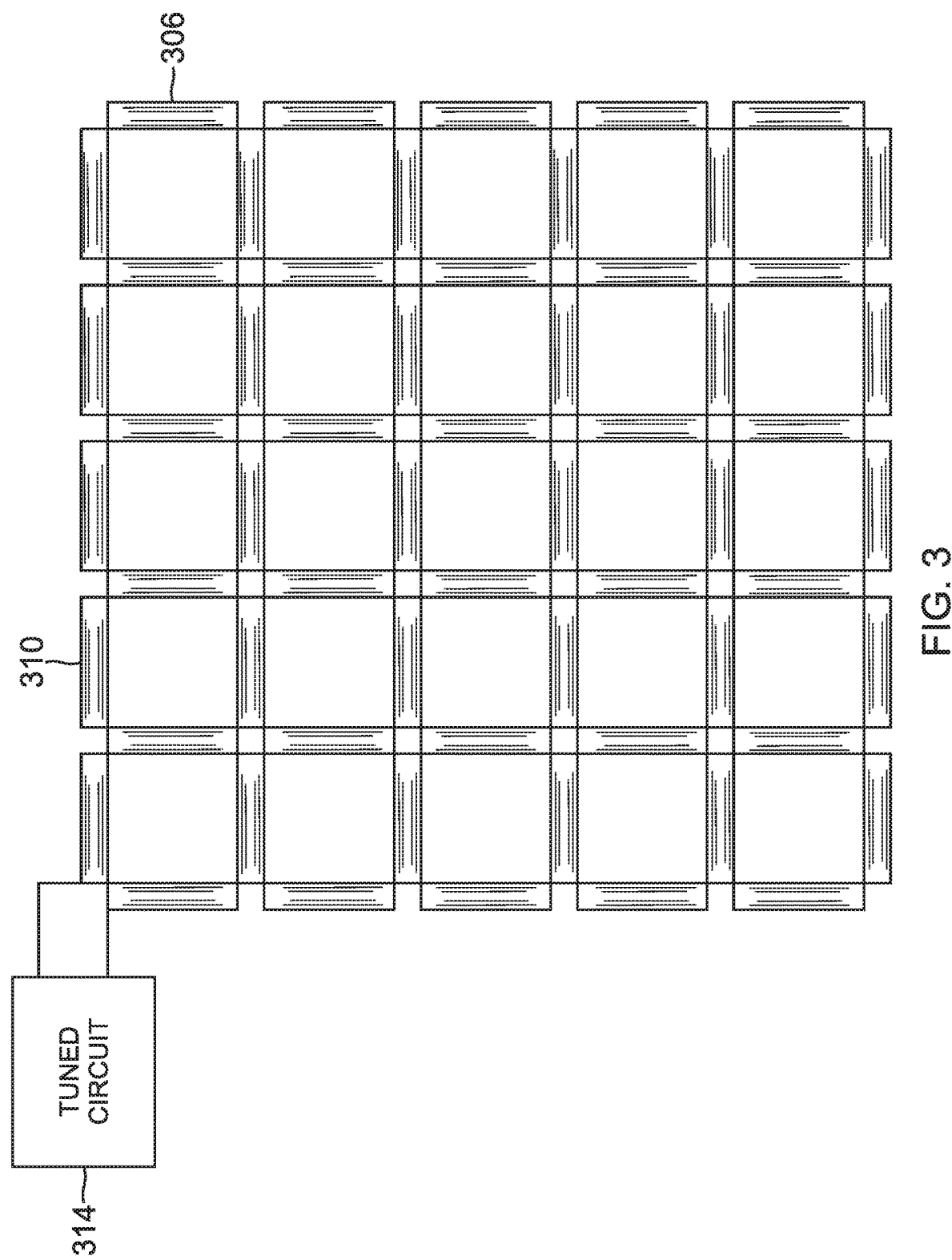
FIG. 3 is a diagram illustrating the connection of the tamper proof cable to a tuned circuit in at least one exemplary embodiment.

FIG. 3 is a diagram illustrating the connection of the braids 306 and 310 to a tuned circuit 314. In the diagram, the right side of the braid 306 is electrically connected to the left side of the row below. In a similar manner, the top of the right side of braid 310 is connected to the bottom of the column immediately to the left. The top of the left most column of braid 310 is connected to the tuned circuit 314 and the left of the top column of braid 306 is connected to the tuned circuit 314. The right of the bottom row of braid 306 and the bottom of the right most column of braid 310 may be left unconnected.

Figure 4:
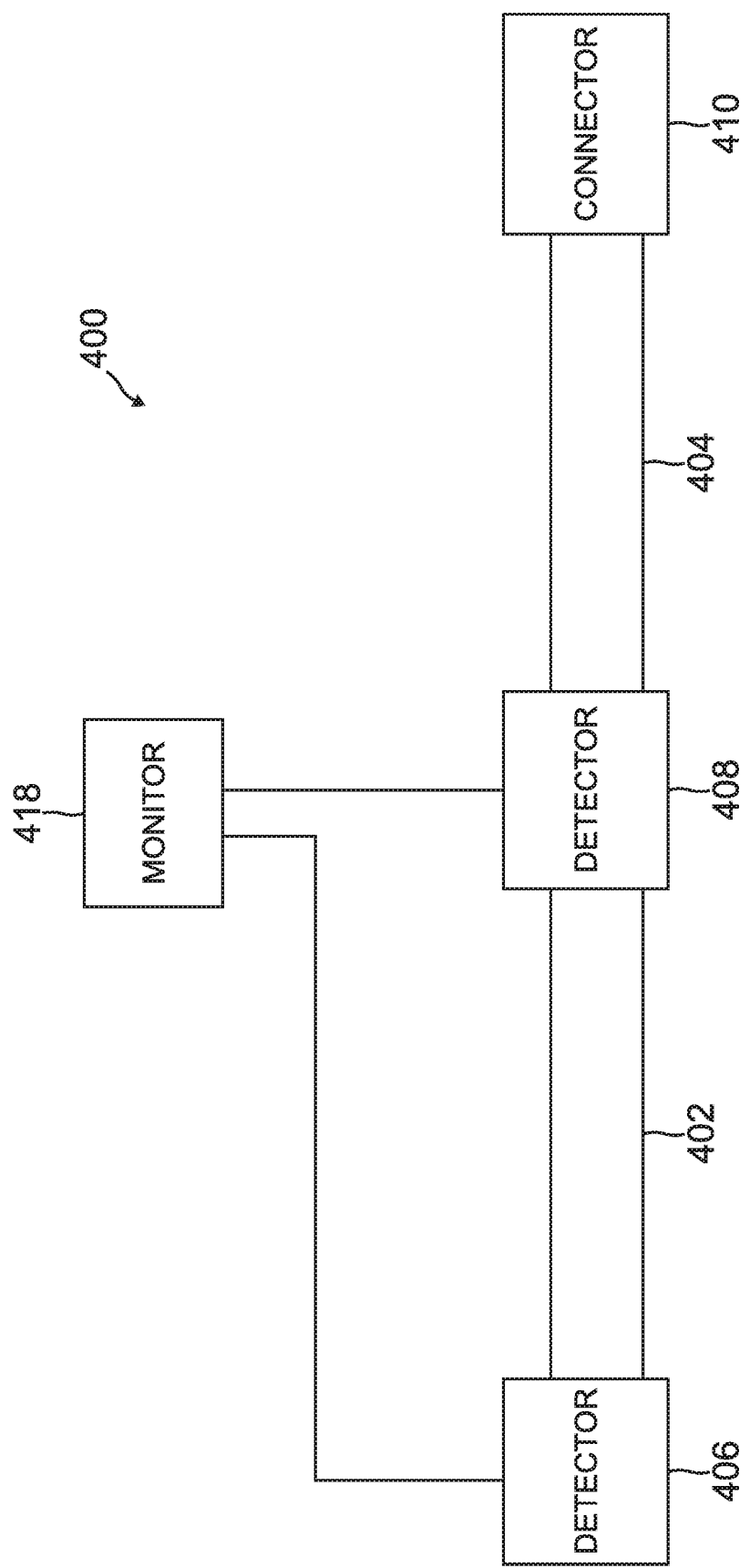
FIG. 4 is a block diagram illustrating the connection of the tamper proof cables to a monitor in at least one exemplary embodiment.

FIG. 4 is a block diagram illustrating one embodiment of a system 400 for monitoring tamper proof cables that function as described above with relation to FIGS. 1-3. In certain implementations, it may be easier to detect capacitance changes due to tampering if the capacitance change is large relative to the base capacitance value. In certain implementations, a capacitance change can be made large in relation to the base capacitance value by segmenting a tamper proof cable into shorter segments. For example, a tamper proof cable may be divided into two segments 402 and 404, where each segment is a separate tuned circuit formed with respective detectors 406 and 408.

Each of detectors 406 and 408 may communicate with a monitor 418 through any suitable technology. For example, the detectors 406 and 408 may be chained together via a multi-drop differential communication network or other communication technology as they communicate with the monitor 418. A further advantage of segmenting the tamper proof cables is that it permits greater localization of the tampering. For example, if the segments 402 and 404 are each two meters in length, when tampering is detected in a segment, it can be located within the particular segment that detected the tampering. However, an increased degree of segmentation may also have a greater cost of implementation.

Figure 5:
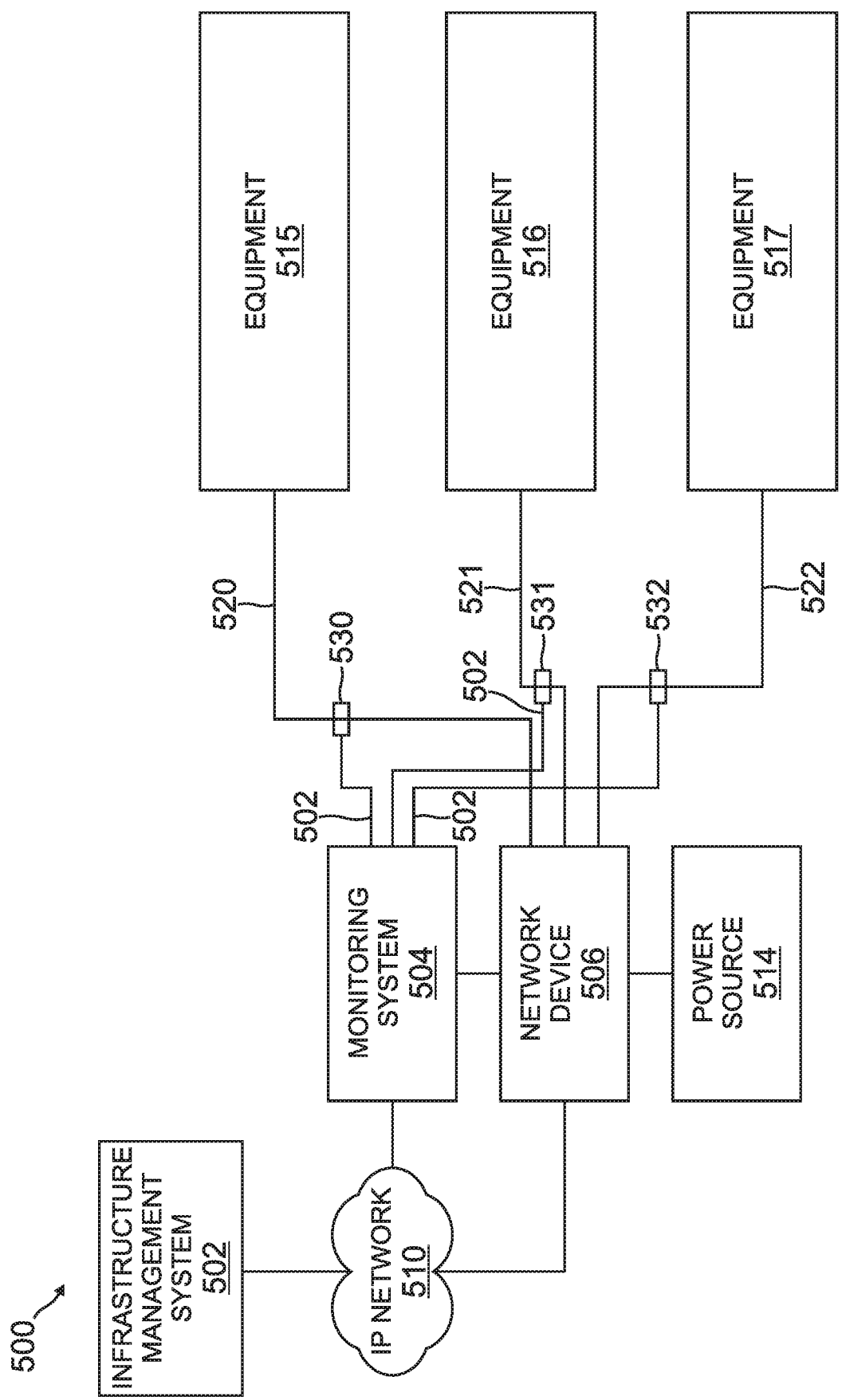
FIG. 5 is a block diagram illustrating the implementation of tamper proof cables within a network in at least one exemplary embodiment.

FIG. 5 shows one exemplary embodiment of a system 500 that incorporates tamper proof cables 520-522, where the system 500 is able to detect movement, piercing, or cutting of the tamper proof cables 520-522. As illustrated in system 500, the tamper proof cables 520-522 connect equipment 515-517 to a network device 506. The equipment 515-517 may be any piece of equipment that is capable of communicating information through the tamper proof cables 520-522. For example, the equipment may be a rack, a panel, a router, or other type of equipment capable of being connected to the tamper proof cables 520-522. In one implementation, the equipment 515-517 communicates with a network device 506 through the tamper proof cables 520-522.

In certain implementations, the tamper proof cables 520-522 are segmented as described above in FIG. 4. When the tamper proof cables 520-522 are segmented, each segment forms a separate tuned circuit, where each tuned circuit has an associated detector 530-532 that provides a signal to a monitoring system 504 through communication lines 540-542. If a segment of one of cables 520-522 experiences tampering in a particular segment, the capacitance in the segment changes and the change in capacitance is detectable by the associated detector 530-532. The associated detector 530-532 then indicates to the monitoring system 504 that a particular segment of the tamper proof cables 520-522 has experienced a capacitance change. If there is only one detector 530-532 for the entire circuit, then the change in capacitance represents that the cable 520-522 experienced tampering somewhere along the length of the cable 520-522.

In at least one embodiment, the monitoring system 504 communicates information produced by the detectors 530-532 to an infrastructure management system 502. In certain examples, the monitoring system 504 may communicate with the infrastructure management system 502 through an IP network 510. Alternatively, the monitoring system 504 may communicate directly with the infrastructure management system 502. In a further alternative implementation, the monitoring system 504 may be part of a network device 506, which may be powered by a power source 514, and the network device communicates information to the infrastructure management system 502 through the IP network 510. When either the monitoring system 504 and/or the network device 506 communicate through the IP Network 510, the monitoring system 504 and/or the network device 506 may include an ETHERNET network interface (and associated RJ-45 port) so that the network device 506 can be coupled to the IP network 510 using a CAT-5 or CAT-6 twisted-pair copper cable. It is to be understood, however, that the network device 506 and/or the monitoring system may communicate with the infrastructure management system through other communicative means.

It is noted that, for ease of explanation, the IP network 510 is shown using a separate cloud symbol, but it is to be understood that the network device 506, monitoring system 504, and equipment 515-517, and cabling 520-522 described herein can be used to implement a part of the IP network 510 over which the signals produced by the detectors 530-532 may be communicated. Alternatively, the IP network 510 over which the information produced by the detectors 530-532 is communicated may be kept separate from other networks through which the equipment 515-517 communicate.

The infrastructure management system 502 is typically implemented as software that runs on a computer that is coupled to the IP network 510. The infrastructure management system 502 may include information about the equipment 515-517 and the cables 520-522. Further, the infrastructure management system 502 may also be configured to receive information pertaining to various other devices and media used to implement the physical layer in the network. For example, with regards to the cables 520-522, the physical layer information (PLI) that is communicated to the infrastructure management system 502 may include information about the equipment 515-517 connected to the cables 520-522 in the network as well as information about the cables 520-522. The cable information may include, for example, an identifier for each cable, information about cable locations within the network, and information about whether the cables or segments of the cables 520-522 have been tampered with.

The infrastructure management system 502 may include or use a database or other data store (not shown) for storing the information provided to it. The infrastructure management system 502 may also include functionality that provides an interface for external devices or entities to access the physical layer information maintained by the infrastructure management system 502. This access can include retrieving information from the infrastructure management entity 502 as well as supplying information to the infrastructure management system 502. In this example, the infrastructure management system 502 is implemented as "middleware" that is able to provide such external devices and entities with transparent and convenient access to the information maintained by the infrastructure management system 502. As such, the infrastructure management system 502 is able to monitor the cables 520-522 for tampering. In certain implementations, the infrastructure management system 502 may also monitor segments of each cable 520-522 for tampering. Accordingly, a user may be able to monitor multiple cables for tampering through interfaces provided by the infrastructure management system 502.

Figure 6:
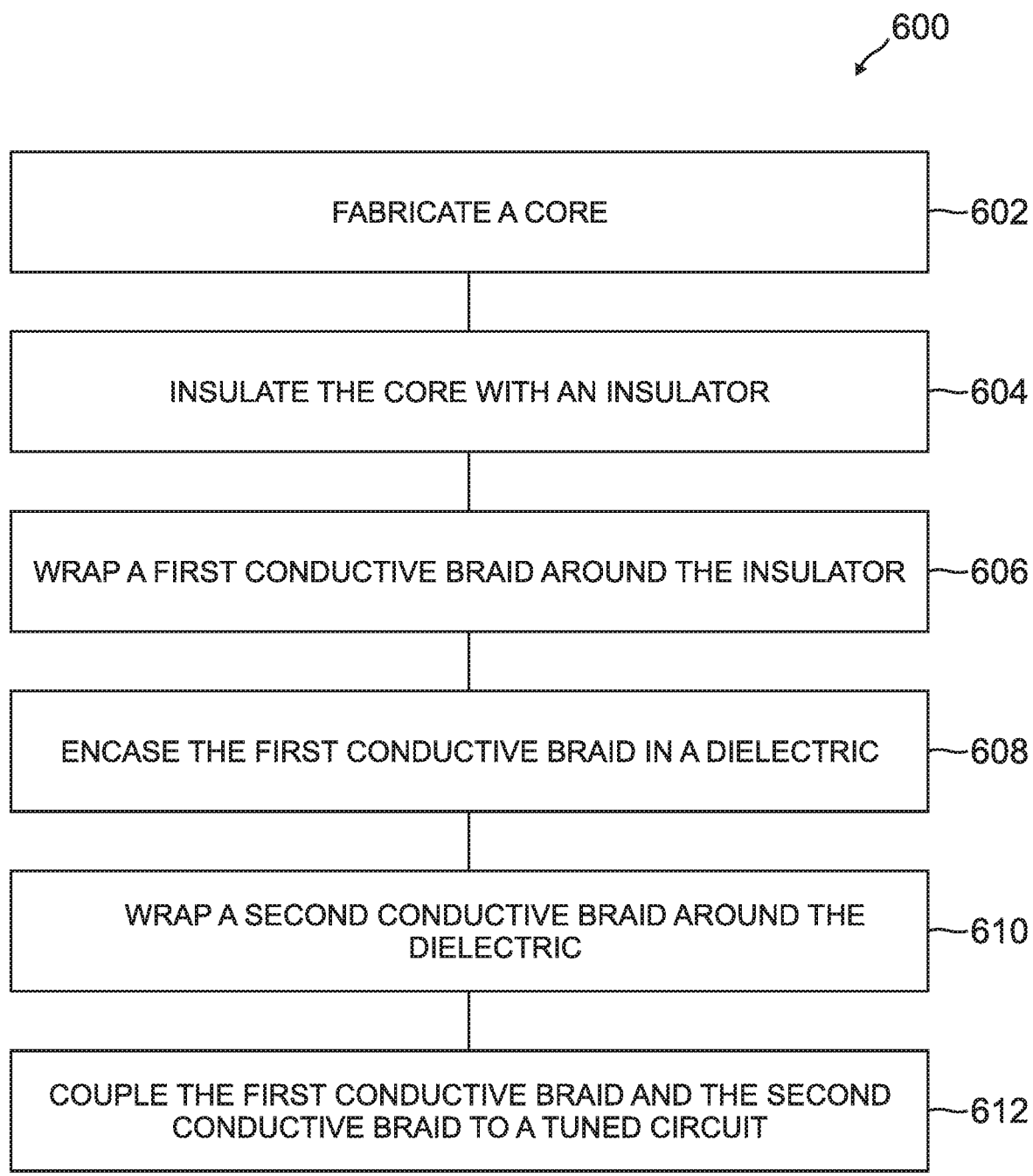
FIG. 6 is a flow diagram of an exemplary method for fabricating a tamper proof cable.

FIG. 6 illustrates a method 600 for fabricating a tamper proof cable. In at least one embodiment, the method 600 proceeds at 602, where a core is fabricated. The core functions as a transmission medium that can be used in a network. The core may be a fiber optic cable, a coaxial cable, a wire, a power cable or other medium capable of being implemented in a network. Method 600 may then proceed at 604 where the core is insulated with an insulator. The insulator functions to protect the core from damage and also to protect the core from other sources of electricity.

In at least one exemplary implementation, the method 600 proceeds at 606, where a first conductive braid is wrapped around the insulator. The method 600 then proceeds at 608, where the first conductive braid is encased in a dielectric. Further, the method 600 proceeds at 610, where a second conductive braid is wrapped around the dielectric. In certain embodiments, the combination of the first conductive braid and the second conductive braid, separated from one another by a dielectric forms a capacitor that extends along a portion of the tamper proof cable.

In further embodiments, the method 600 proceeds at 612, where the first conductive braid and the second conductive braid are coupled to a tuned circuit. When the first conductive braid and the second conductive braid are coupled to the tuned circuit, the capacitor formed by the first conductive braid and the second conductive braid have a frequency response that can be monitored. When the tamper proof cable is stationary, the frequency response of the tuned circuit remains constant. However, when the tamper proof cable undergoes any change that can alter the capacitance of the capacitor, the frequency response likewise changes. The change in the frequency response can be monitored to indicate that the tamper proof cable has been tampered with. Accordingly, a user can monitor cables within a system for tampering.

Example Embodiments

Example 1 includes a tamper proof cable, the tamper proof cable comprising: a core, the core providing a transmission medium through the cable; an insulator enveloping the core; a first conductive braid encircling the insulator; a dielectric enveloping the first conductive braid; and a second conductive braid encircling the dielectric.

Example 2 includes the tamper proof cable of Example 1, wherein the first conductive braid is oriented in a first direction and the second conductive braid is oriented in a second direction, the second direction being orthogonal to the first direction.

Example 3 includes the tamper proof cable of any of Examples 1-2, wherein the first conductive braid, the dielectric, and the second conductive braid form a capacitor in a tuned circuit.

Example 4 includes the tamper proof cable of Example 3, further comprising one or more detectors, wherein the tuned circuit is connected to the one or more detectors.

Example 5 includes the tamper proof cable of any of Examples 3-4, wherein the tuned circuit is coupled to a first side of the tamper proof cable, wherein the tuned circuit connects to both the first conductive braid and the second conductive braid, wherein the first conductive braid and the second conductive braid are disconnected at a second side of the tamper proof cable.

Example 6 includes the tamper proof cable of any of Examples 3-5, wherein the tamper proof cable is separated into segments, each segment associated with a separate detector in the one or more detectors.

Example 7 includes the tamper proof cable of any of Examples 3-6, wherein the one or more detectors are coupled to a monitor. Example 8 includes the tamper proof cable of Example 7, wherein the one or more detectors are coupled to the monitor through a multi-drop differential communication network.

Example 9 includes the tamper proof cable of any of Examples 7-8, wherein the monitor communicates with an infrastructure management system, wherein the infrastructure management system indicates possible tampering to a user.

Example 10 includes the tamper proof cable of Example 9, wherein the monitor further communicates the location of the tampering to the infrastructure management system.

Example 11 includes the tamper proof cable of any of Examples 1-10, wherein the core comprise at least one of: a coaxial cable; a transmission line; and a fiber optic cable.

Example 12 includes a method for fabricating a tamper proof cable, the method comprising: fabricating a core, wherein the core provides a transmission medium through the cable; insulating the core with an insulator; wrapping a first conductive braid around the insulator; encasing the first conductive braid in a dielectric; wrapping a second conductive braid around the dielectric; and coupling the first conductive braid and the second conductive braid to a tuned circuit.

Example 13 includes the method of Example 12, wherein the first conductive braid is oriented in a first direction and the second conductive braid is oriented in a second direction, the second direction being orthogonal to the first direction.

Example 14 includes the method of any of Examples 12-13, further comprising connecting the tuned circuit to one or more detectors. Example 15 includes the method of Example 14, further comprising segmenting the tamper proof cable into segments, each of the segments associated with a separate detector in the one or more detectors.

Example 16 includes the method of any of Examples 14-15, further comprising coupling the one or more detectors to a monitor.

Example 17 includes the method of Example 16, coupling the one or more detectors to the monitor through a multi-drop differential communication network.

Example 18 includes the method of any of Examples 16-17, wherein the monitor communicates with an infrastructure management system, wherein the infrastructure management system indicates possible tampering to a user.

Example 19 includes the method of any of Examples 9-18, wherein the monitor further communicates the location of the tampering to the infrastructure management system.

Example 20 includes the method of any of Examples 12-19, wherein the tuned circuit is coupled to a first side of the tamper proof cable, wherein the tuned circuit connects to both the first conductive braid and the second conductive braid, wherein the first conductive braid and the second conductive braid are disconnected at a second side of the tamper proof cable.

Example 21 includes the method of any of Examples 12-20, wherein the core comprises at least one of: a coaxial cable; a transmission line; and a fiber optic cable.

Example 22 includes a system for monitoring cables for tampering, the system comprising: one or more pieces of equipment; one or more tamper proof cables connecting the one or more pieces of equipment within a network, wherein the each tamper proof cable comprises: a core, the core providing a transmission medium through the cable; an insulator enveloping the core; a first conductive braid encircling the insulator; a dielectric enveloping the first conductive braid; and a second conductive braid encircling the dielectric, the first conductive braid, the dielectric, and the second conductive braid forming a capacitor in one or more capacitors; one or more detectors, each detector coupled to at least a portion of the one or more tamper proof cables, each detector in the one or more detectors and an associated capacitor in the one or more capacitors forming a tuned circuit, the one or more detectors providing a signal when an associated portion of the one or more tamper proof cables is tampered with; a monitor coupled to the one or more detectors, wherein the monitor notifies an infrastructure management system when the signal is received from the one or more detectors.

Example 23 includes the system of Example 22, wherein the first conductive braid is oriented in a first direction and the second conductive braid is oriented in a second direction, the second direction being orthogonal to the first direction.

Example 24 includes the system of any of Examples 22-23, wherein the tuned circuit is coupled to a first side of the tamper proof cable, wherein the tuned circuit connects to both the first conductive braid and the second conductive braid, wherein the first conductive braid and the second conductive braid are disconnected at a second side of the tamper proof cable.

Example 25 includes the system of any of Examples 22-24, wherein the tamper proof cable is separated into segments, each segment associated with a separate detector in the one or more detectors.

Example 26 includes the tamper proof cable of any of Examples 22-25, wherein the one or more detectors are coupled to the monitor through a multi-drop differential communication network.

Example 27 includes the tamper proof cable of any of Examples 9-26, wherein the monitor further communicates the location of the tampering to the infrastructure management system.

A number of embodiments have been described. Nevertheless, it will be understood that various modifications to the described embodiments may be made without departing from the spirit and scope of the claimed invention. Also, combinations of the individual features of the above-described embodiments are considered within the scope of the inventions disclosed here.

What is claimed is:

1. A tamper proof cable, the tamper proof cable comprising:
    a core, the core providing a transmission medium through the cable;
    an insulator enveloping the core;
    a first conductive braid encircling the insulator;
    a dielectric enveloping the first conductive braid;
    a second conductive braid encircling the dielectric; and
    wherein the first conductive braid, the dielectric, and the second conductive braid form a capacitor having a select base capacitance value in a tuned circuit; and
    at least one detector configured to determine a capacitance change in the tuned circuit relative to the select base capacitance value.

2. The tamper proof cable of claim 1, wherein the first conductive braid is oriented in a first direction and the second conductive braid is oriented in a second direction, the second direction being orthogonal to the first direction.

3. The tamper proof cable of claim 1, wherein the tuned circuit is connected to the one or more detectors.

4. The tamper proof cable of claim 1, wherein the tuned circuit is coupled to a first side of the tamper proof cable, wherein the tuned circuit connects to both the first conductive braid and the second conductive braid, wherein the first conductive braid and the second conductive braid are disconnected at a second side of the tamper proof cable.

5. The tamper proof cable of claim 1, wherein the tamper proof cable is separated into segments, each segment associated with a separate detector in the one or more detectors.

6. The tamper proof cable of claim 1, wherein one or more detectors are coupled to a monitor.

7. The tamper proof cable of claim 6, wherein the one or more detectors are coupled to the monitor through a multi-drop differential communication network.

8. The tamper proof cable of claim 6, wherein the monitor communicates with an infrastructure management system, wherein the infrastructure management system indicates possible tampering to a user.

9. The tamper proof cable of claim 8, wherein the monitor further communicates a location of the tampering to the infrastructure management system.

10. The tamper proof cable of claim 1, wherein the core comprise at least one of:
 a coaxial cable;
 a transmission line; and
 a fiber optic cable.

11. A method for fabricating a tamper proof cable, the method comprising:
 fabricating a core, wherein the core provides a transmission medium through the cable;
 insulating the core with an insulator;
 wrapping a first conductive braid around the insulator;
 encasing the first conductive braid in a dielectric;
 wrapping a second conductive braid around the dielectric;
 coupling the first conductive braid and the second conductive braid to a tuned circuit, wherein the first conductive braid, the dielectric, and the second conductive braid form a capacitor having a select base capacitance value with the tuned circuit; and
 connecting the tuned circuit to one or more detectors, the one or more detectors configured to determine a capacitance change in the tuned circuit relative to the select base capacitance value.

12. The method of claim 11, wherein the first conductive braid is oriented in a first direction and the second conductive braid is oriented in a second direction, the second direction being orthogonal to the first direction.

13. The method of claim 11, further comprising segmenting the tamper proof cable into segments, each of the segments associated with a separate detector in the one or more detectors.

14. The method of claim 11, further comprising coupling the one or more detectors to a monitor.

15. The method of claim 14, coupling the one or more detectors to the monitor through a multi-drop differential communication network.

16. The method of claim 14, wherein the monitor communicates with an infrastructure management system, wherein the infrastructure management system indicates possible tampering to a user.

17. The method of claim 16, wherein the monitor further communicates a location of the tampering to the infrastructure management system.

18. The method of claim 11, wherein the tuned circuit is coupled to a first side of the tamper proof cable, wherein the tuned circuit connects to both the first conductive braid and the second conductive braid, wherein the first conductive braid and the second conductive braid are disconnected at a second side of the tamper proof cable.

19. The method of claim 11, wherein the core comprises at least one of:
 a coaxial cable;
 a transmission line; and
 a fiber optic cable.

20. A system for monitoring cables for tampering, the system comprising:
 one or more pieces of equipment;
 one or more tamper proof cables connecting the one or more pieces of equipment within a network, wherein the each tamper proof cable comprises:
  a core, the core providing a transmission medium through the cable;
  an insulator enveloping the core;
  a first conductive braid encircling the insulator;
  a dielectric enveloping the first conductive braid; and
  a second conductive braid encircling the dielectric, the first conductive braid, the dielectric, and the second conductive braid forming a capacitor having a base capacitance value in one or more capacitors;
 one or more detectors, each detector coupled to at least a portion of the one or more tamper proof cables, each detector in the one or more detectors and an associated capacitor in the one or more capacitors forming a tuned circuit, the one or more detectors configured to detect a capacitance change in the tuned circuit relative to the base capacitance value and provide a signal when an associated portion of the one or more tamper proof cables is tampered with;
 a monitor coupled to the one or more detectors, wherein the monitor notifies an infrastructure management system when the signal is received from the one or more detectors.

21. The system of claim 20, wherein the first conductive braid is oriented in a first direction and the second conductive braid is oriented in a second direction, the second direction being orthogonal to the first direction.

22. The system of claim 20, wherein the tuned circuit is coupled to a first side of the tamper proof cable, wherein the tuned circuit connects to both the first conductive braid and the second conductive braid, wherein the first conductive braid and the second conductive braid are disconnected at a second side of the tamper proof cable.

23. The system of claim 20, wherein the tamper proof cable is separated into segments, each segment associated with a separate detector in the one or more detectors.

24. The tamper proof cable of claim 20, wherein the one or more detectors are coupled to the monitor through a multi-drop differential communication network.

* * * * *